(12) United States Patent
Surberg et al.

(10) Patent No.: US 6,592,286 B2
(45) Date of Patent: Jul. 15, 2003

(54) FIXING MEMBER FOR USE WITH A SETTING MATERIAL

(75) Inventors: Cord-Henrick Surberg, Feldkirch (AT); Marcel John, Mels (CH); Ralf Laternser, Lohmar (DE); Michael Siemers, Feldkirch (AT); Pietro Bianchi, Feldkirch (AT); Gerhard Köck, Nenzing (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/057,360

(22) Filed: Oct. 23, 2001

(65) Prior Publication Data

US 2002/0076272 A1 Jun. 20, 2002

(30) Foreign Application Priority Data

Oct. 25, 2000 (DE) .......................................... 10052810

(51) Int. Cl.⁷ ............................................... E04C 3/30
(52) U.S. Cl. ...................... 403/267; 403/268; 52/764; 52/707
(58) Field of Search .................. 52/704, 707; 403/265, 403/266, 267, 268

(56) References Cited

U.S. PATENT DOCUMENTS

| 3,867,804 A | * | 2/1975 | Wilson ..................... 52/704 X |
| 4,430,025 A | | 2/1984 | Ciavatta |
| 4,993,900 A | | 2/1991 | Hügel et al. |
| 5,243,805 A | | 9/1993 | Fricker |
| 5,807,014 A | * | 9/1998 | Goto .......................... 403/268 |
| 5,974,761 A | * | 11/1999 | Mochizuki et al. ..... 403/267 X |

FOREIGN PATENT DOCUMENTS

| EP | 0670429 | 9/1995 |
| GB | 2169050 | 7/1986 |

* cited by examiner

Primary Examiner—Lynne H. Browne
Assistant Examiner—John R. Cottingham
(74) Attorney, Agent, or Firm—Sidley Austin Brown & Wood, LLP

(57) ABSTRACT

A fixing member (1) designed for at least partially interlocking axial securement in a solid body (4) by means of an initially fluid setting material (2) introduced into a blind borehole (3), and is intermediately mechanically fixed and adjustable. The fixing member (1) is a peripherally closed medium to thickwalled tubular member (5), at least in part radially deformed and of uniform wall thickness having an axial passageway (6) extending through it.

9 Claims, 2 Drawing Sheets

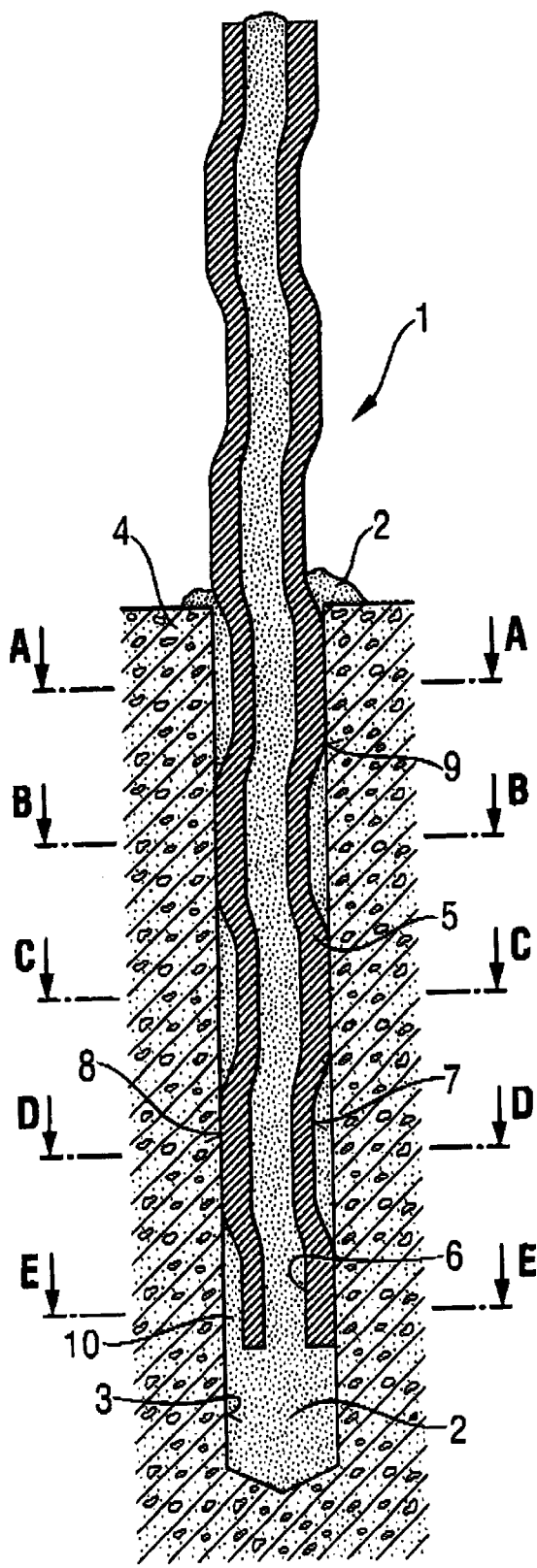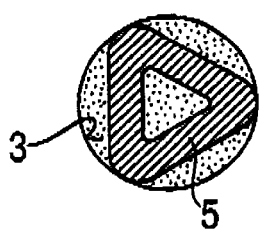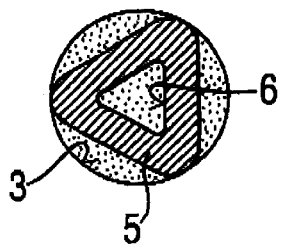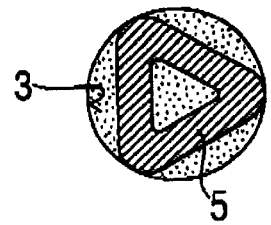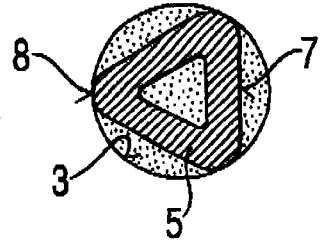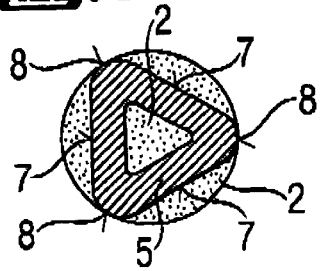

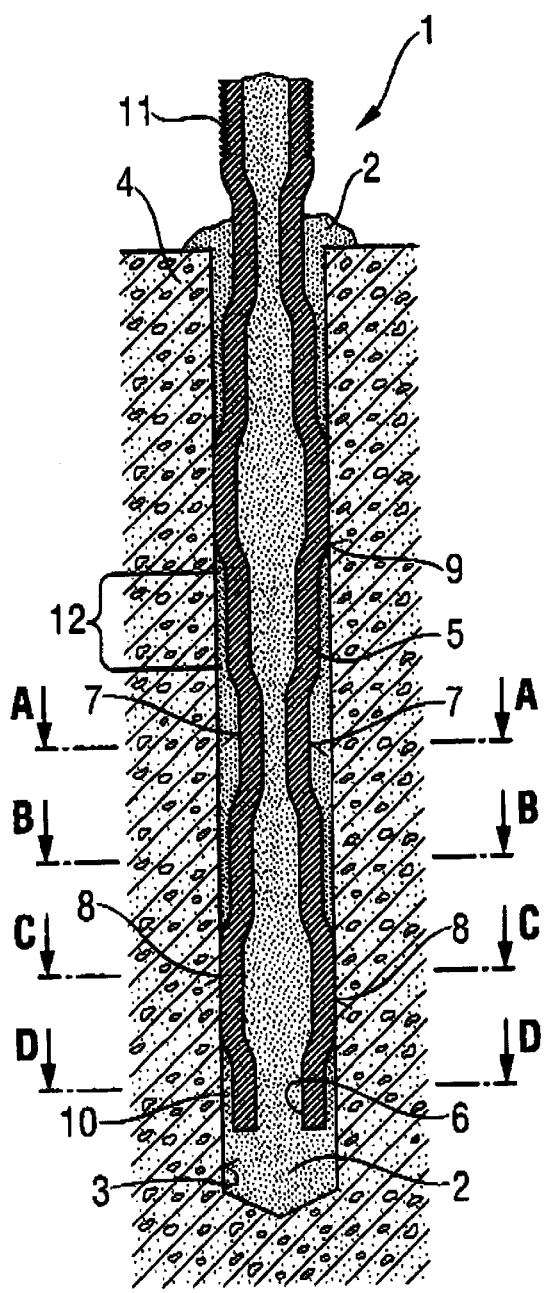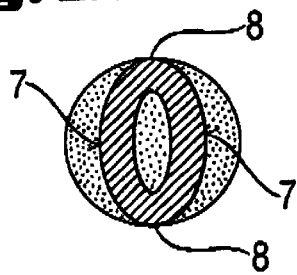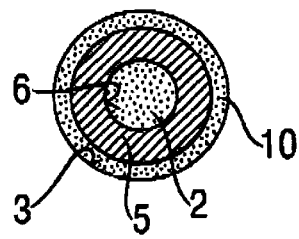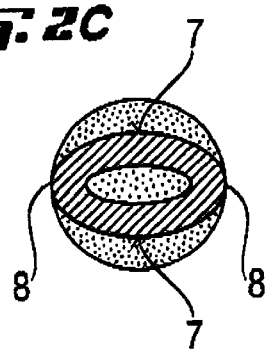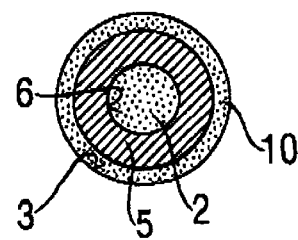

FIXING MEMBER FOR USE WITH A SETTING MATERIAL

BACKGROUND OF THE INVENTION

The invention relates to a fixing member for use with setting materials, in particular an anchor bolt securable in a blind borehole in concrete using an injection resin mortar.

To anchor a load on the external surface of a fixed structural component such as reinforced concrete, fixing members are conventionally used that are inserted into blind boreholes and engage the structural component creating an interlocking and frictional connection therewith. The fixing member are sometimes fastened adhesively using a setting material between the fixing members and the wall of the borehole, whereby the setting material is injected either prior to introduction of the fixing member by using a destructible tubular bag or by way of injection ports or openings after introduction of the fixation means, whereby mainly excess material overflows the annular space. The fixing member situated loosely in the borehole must be fixed in its position and cannot be mechanically stressed until the material sets, which, for example, in the case of a ceiling assembly, requires additional support of the dead weight. On the other hand, in the case of elevated ambient temperatures and the consequently faster reaction time the fixing member that must be introduced into the borehole immediately after the onset of the reaction can generally no longer be re-adjusted. Such method steps that necessarily follow upon one another represent a significant coordination problem particularly in carrying out complex construction projects.

The fixing member subjected to traction and shearing forces are generally designed as anchor or anchors bolts. In the case of the anchor a threaded bolt protruding above the external surface serves in the attachment of assembly components. The anchor bolt that functions as an anchor with displacement controlled expansion for the connection of two surfaces is designed with external ribs for the purpose of interlocking embodiment as an extension of the reinforcement of concrete subsequently poured around it. Anchor bolts are a very inexpensive mass-produced product that are generally manufactured as an elongated product that is cut to length as needed.

U.S. Pat. No. 5,466,086 discloses a fixing member provided with an axial passage running through it and having radial ribs that advantageously form an alternating changeover between set material and the fixing member along its axial plane in direct contact with the opposing surface of the borehole wall, the alternating contact being advantageous in stopping cracks. DE4033396 discloses a sleeve-like assembly element for the fixing member designed as an anchor bolt having radial recesses, and ribs axially running so centering the anchor bolt coaxially, that being embedded in the setting material also act as crack stoppers. DE431594 discloses anchor bolts wherein the crack stop is realized using non-adhesive longitudinal webs.

According to DE19725923 the radial grooves of the anchor bolt are formed from angular indentations arranged in even intervals. According to EP0947713 the surfaces of the anchor bolt making contact with the adjacent surfaces of the borehole are in an alternating arrangement and surrounded by grooves that separate longitudinally and then again unite.

Further, DE4206260 discloses a device for rotary swaging/kneading of metal tubes.

SUMMARY OF THE INVENTION

The object of the invention involves a fixing member that is uncomplicated and can be mass produced, the fixing member being used with setting materials, in particular an anchor bolt for use wit injection resin mortar. A further object involves the capability of pre-positioning and pre-stressing the fixing member prior to its being adhesively bonded and in the time interruption of the process steps.

Essentially a fixing member, advantageously designed as an anchor bolt of the type of an injection anchor with displacement controlled expansion, a so-called dowel, using a setting material in a blind borehole is anchored in concrete, formed as a peripherally closed medium or thick-walled tube of uniform wall thickness with an axial passage running through it, which is radially at least partially indented or deformed.

Peripherally closed tubes of uniform wall thickness are available as semi-finished tubular goods and are easily cut locally to the appropriate, required length. The initially fluid setting material can easily be injected through the axial passage in the already positioned fixing member into the bottom of the blind borehole and externally into the annular space formed with the inside wall of the blind borehole. The deformations in the anchor bolt form, on the insertion section, radial recesses with respect to the inside wall of the borehole, which form a interlocking axial connection after the material hardens or sets, for example, a reaction resin mortar. In the cross-section of the tubular member, while maintaining the peripheral length of the neutral chord by the deformation, protuberances are formed at other peripheral locations which, depending on the shape of the protuberance, extend beyond the original diameter.

The minimal reduction of the tensile strength by the medium- to thick-walled circular ring surface versus the cylindrical area of the round profiles ("rounds") is acceptable or, with the same weight of the fixing member, compensable by the use of a larger diameter of the fixing member. The area moment determining the flexural resistance for transmission of the shearing forces is comparable in tubes with that of round profiles. By the uniform wall thickness, the force inducted into the fixing member inside of the borehole, in particular even with dynamic loading, can be transferred without locally significant deformations or damage in the fixing member.

The local protuberances at the margin of the indentations extend advantageously at least partially beyond a coaxial diameter, which is slightly larger than that of the undeformed tubular member or that of the associated blind borehole, whereby the fixing member can be centered by said local protuberances coaxially in the associated blind borehole and can be subsequently mechanically positioned and re-adjusted with respect to minor loads. The injection of the adhesive setting material through the axial passageway in the tubular member can be done at any later time prior to stressing with the nominal loading.

The advantageous alternating changeover between setting material and direct contact with the wall of the borehole along the axial plane forms a crack stop in the form of an axially limited length for any crack proliferating along the interface boundary between the setting material and the fixing member.

The deformed partial areas of the tubular member advantageously form even flat or planar areas, whereby a strain-resistant stiffening of the sectional area of the fixing member is created.

The deformed regions are advantageously arranged at least in part alternating along the axial region of the fixing member, whereby the deformed regions are further advantageously half-angularly displaced; thus, in the case of two opposing deformed regions at 90° or in the case of indentations forming an equilateral triangle 60°.

Along the deformed regions, grooves are formed advantageously extending along the length of the fixing member, which diverge longitudinally in the preferably circular-round transition areas or converge again, whereby the peripherally uniform distribution of the setting material exiting at the base of the borehole is achieved.

The fixing member is advantageously manufactured of cold-worked steel using the rotary swaging/kneading process, whereby the structural fabric is not damaged by cutting work and its strength is increased compared to hot-working. In particular, the rotary swaging/kneading process is applicable to tubular material available as a tubular semi-finished product, whereby the fixing member can be pre-fabricated at least in part continuously from tubular material and the axially periodic deformed regions and protuberances can be cut to length at the site.

The fixing members being cut to the desired length for tranmission of forces are designed as anchor bolts in an initial preferred variation, which are introduced into a blind borehole with half the length of the overall length of approximately 20 times the diameter and further advantageously mechanically positioned. The anchor bolt is bonded with the solid body interlocking adhesively by using injection mortar.

In an expedient application of the anchor bolt as an anchor with displacement controlled expansion, a hole made previously in another solid body, previously or subsequently filled with a initially fluid setting material, is positioned at the free end of the anchor bolt, whereby after setting of the setting material both bodies are adhesively bonded interlocking with each other.

In a preferred embodiment of the anchor, an inner or outer screw thread is applied to the rounded end of a cut-to-length fixing member before or after it is secured in the solid body.

BRIEF DESCRIPTION OF THE INVENTION

The invention is more fully explained using exemplary embodiments in which:

FIG. 1 is an axial section of an anchor bolt embodying the invention;

FIGS. 1A–1E are cross-sections along Lines A—A to E—E in FIG. 1;

FIG. 2 is an axial section of another anchor embodying the invention; and

FIGS. 2A–D are cross section taken along lines A—A to D—D in FIG. 2.

DETAILED DESCRIPTION OF THE INVENTION

According to FIG. 1 a fixing member is formed of cut-to-length tubular material having a total length corresponding approximately to 20 times the diameter—required for force transmission—and formed as an anchor bolt interlocking by being fixed in concrete at an insertion length relative to half of its overall length by means of a setting material 2 in an axially extending blind borehole 3 in a solid body 4. The fixing member 1 is comprised of a peripherally closed medium- to thick-walled tubular member 5 of uniform wall thickness of ⅛ to ¼ of its diameter and is radially deformed and provided with an axial passageway 6 extending through it. The alternating deformed regions 7 are arranged along the axial inserted length with radial recesses with respect to the opposing inside wall of the borehole 3.

In the cross-section of the tubular member 5 at a point on the periphery displaced 60° while maintaining the radial length of the neutral chord, forms the three protuberances 8 in association with the radially evenly distributed, indentations 7 forming relatively flat or planar regions. The protuberances 8 extend over a coaxial diameter that is slightly larger than that of the undeformed tubular member 5 and that of the associated blind borehole 3. The alternating changeover along the axial plane of the fixing member relative to the contact between the setting material 2 and the wall of the borehole 3 forms—for a crack proliferating along the boundary interface between the setting material 2 and the fixation means 1—a crack stop in the form of a segment axially delimited by deformed region 7. Along the peripherally axially displaced radially deformed regions 7, grooves 10 form along the fixing member 1.

According to FIG. 2 a fixing member formed of cut-to-length tubular material, with a total length corresponding approximately to the 20 times the diameter—required for force transmission—and executed as an anchor is interlockingly fixed axially in concrete at an insertion length relative to the half of its overall length by means of a setting material 2 in an axially extending blind borehole 3 in a solid body 4. The cut-to-length free end of the tubular member 5 without deformed regions in its axial region and not situated in the blind borehole has an external screw thread 11. In the cross-section of the tubular member 5, protuberances are locally formed, while maintaining the radial length of the neutral chord at a point displaced peripherally 90°, local protuberances are formed in association with the deformed region 7 forming the two peripherally equally spaced, slightly curved flat regions. Grooves 10 are formed along the length of the fixing member in the undeformed round, axial transition regions 12 of the peripherally axially alternating radially deformed regions 7.

What is claimed is:

1. An axially extending fixing member at least partially interlocking in the axial direction with a blind borehole (3) in a solid structural member (4) using an initially fluid setting material (2) introduced into the borehole (3), wherein said fixing member (1) is a peripheral closed wall tubular member (5) having a uniform wall thickness in a range of ⅛ to ¼ of the diameter thereof with an axially extending passageway therethrough and is at least partially deformed in an axially extending region into axially extending surface contact with said borehole (3).

2. A fixing member, as set forth in claim 1, wherein said tubular member (5) can be cut to a desired length from an undeformed tubular material as a semi-finished product.

3. A fixing member, as set forth in claim 2, wherein at least one axially extending protuberance (8) is formed in an at least partially axially deformed region (7) of said tubular member (5) and extends radially outwardly beyond a first diameter slightly greater than a second diameter of said undeformed tubular material.

4. A fixing member, as set forth in claim 3, wherein direct contact is provided on an axially extending plane by said tubular member (5) with said setting material (2) and with a surface of said blind borehole (3).

5. A fixing member, as set forth in claim 3, wherein said deformed region (7) of said tubular member (5) has an axially extending planar region (7).

6. A fixing member, as set forth in claim 5, wherein said deformed region (7) of said tubular member (5) has alternating axially extending planar regions (7).

7. A fixing member, as set forth in claim 6, wherein at least an axially extending space (10) is formed between said borehole and an outer surface of said deformed region (7), with said grooves divided into axially extending transition regions (12).

8. A fixing member, as set forth in claim 1, wherein said tubular member is formed as an anchor bolt cut to length from tubular material.

9. A fixing member, as set forth in claim 1, wherein said borehole member is formed as an anchor cut to length from tubular material and having an axially extending screw thread at an end arranged to extend outwardly from said borehole (3) in a solid structural member comprising the steps of cutting an axially elongated fixing member from a tubular material for a selected length and deforming the fixing member with alternating axially extending deformed regions having axially extending protuberance, securing the deformed region in the borehole with the protuberance in frictional securing contact with the borehole surface, and injecting an initially fluid setting material into a passageway through said fixing member from an opening of the fixing member located outwardly from the structural member to a bottom of said blind borehole and into a space between an outer surface of said fixing member and the borehole surface.

* * * * *